P. SEITZ.
Sugar-Cane Cutter.
No. 224,733.   Patented Feb. 17, 1880.
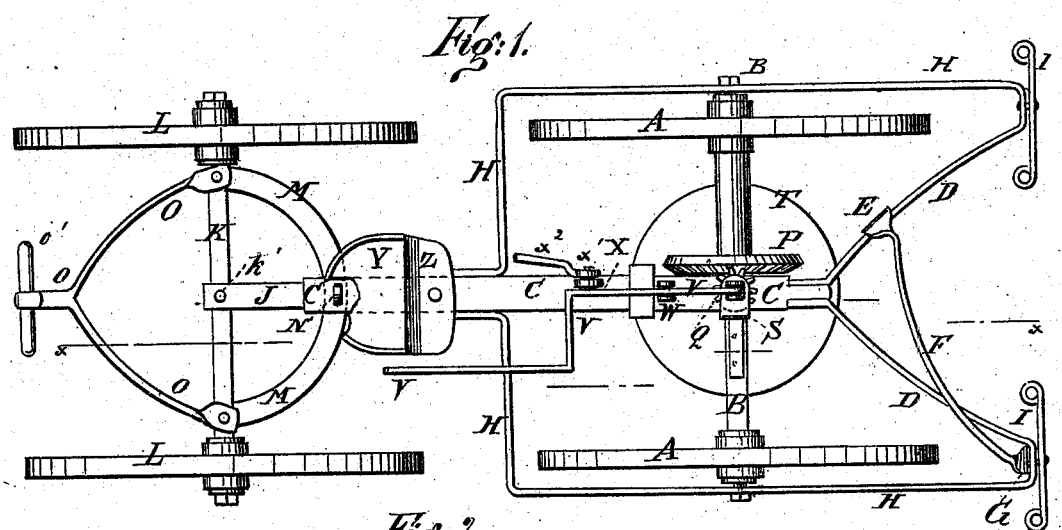
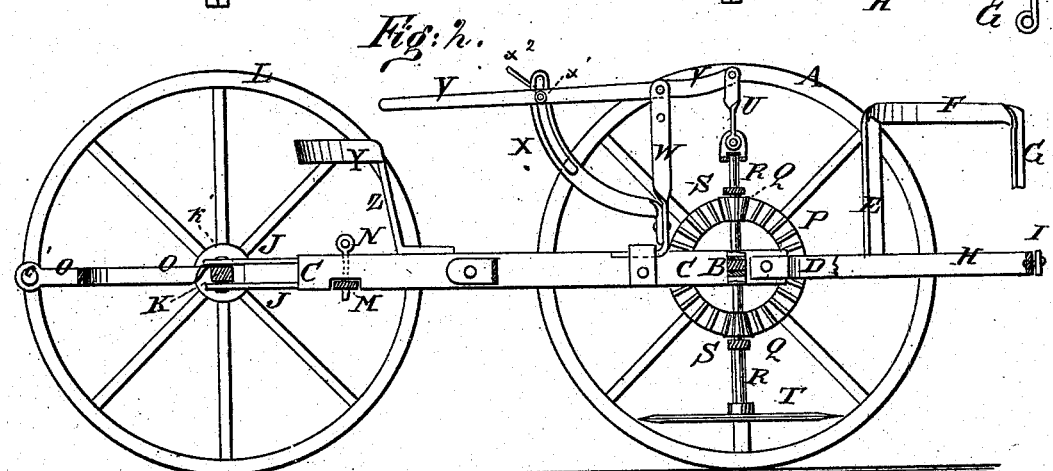
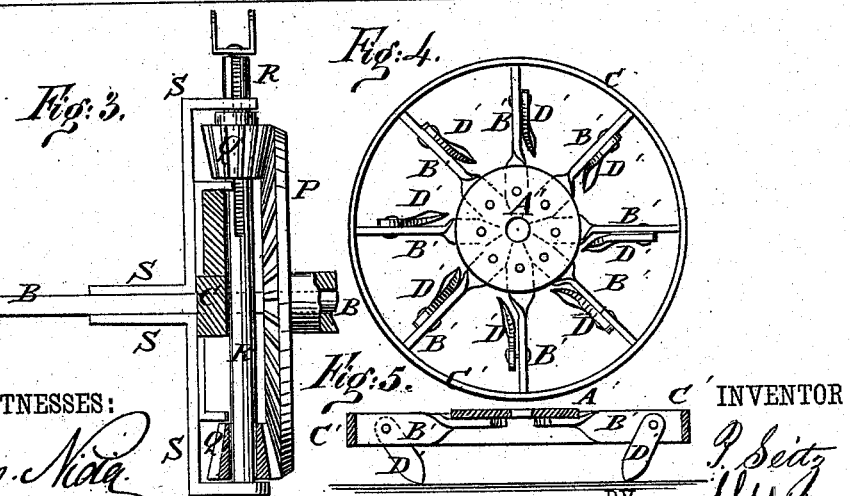

UNITED STATES PATENT OFFICE.

PHILIP SEITZ, OF BATON ROUGE, LOUISIANA, ASSIGNOR TO HIMSELF AND JORDAN C. HOLT, OF SAME PLACE.

SUGAR-CANE CUTTER.

SPECIFICATION forming part of Letters Patent No. 224,733, dated February 17, 1880.

Application filed June 11, 1879.

*To all whom it may concern:*

Be it known that I, PHILIP SEITZ, of Baton Rouge, in the parish of East Baton Rouge and State of Louisiana, have invented a new and useful Improvement in Sugar-Cane Cutters, of which the following is a specification.

Figure 1 is a top view of my improved machine. Fig. 2 is a longitudinal section of the same, taken through the broken line *x x*, Fig. 1. Fig. 3 is a detail section of the same, showing the gearing enlarged. Fig. 4 is a detail top view of the rotary hoe. Fig. 5 is a detail cross-section of the same.

Similar letters of reference indicate corresponding parts.

The object of this invention is to improve the construction of the machine for which Letters Patent No. 196,598 were granted to me October 30, 1877, so as to make it more convenient in use and more effective in operation.

The invention consists in the combination of the curved bars, the curved bar and its standards, and the side bars with the wheels and axle and the reach; in the combination of the large bevel-gear wheel, the two small bevel-gear wheels, and the guard-bars with the inwardly-extended hub of the wheel, the axle, the reach, and the shaft that carries the cutter; in the combination of the connecting-bar, the lever, the standard, and the curved and slotted arm, provided with the bolt and handnut, with the sliding rotating shaft that carries the cutter, and with the reach.

A represents the forward wheels, which revolve upon the journals of the axle B. C is the reach, which is rigidly attached, near its forward end, to the middle part of the axle B. To the opposite side of the forward end of the reach C are attached the ends of the two bars D, which are curved outward and forward, as shown in Fig. 1, to serve as guides to collect the cane and bring it to the middle part of the machine. To one of the bars D, at a little distance from its inner end, is attached the lower end of a standard, E, to the upper end of which is attached the inner end of a bar, F. The bar F is curved outward and forward, and its outer end is attached to the upper end of a standard, G, the lower end of which is attached to the forward end of the other bar, D.

The two standards E G and the curved bar F may be made in one piece, if desired.

The forward ends of the curved bars D are attached to the forward ends of the bars H, which pass back along the outer sides of the wheels A, are attached to the ends of the axle B, and at the rear of the said wheels A are bent inward, and their rear ends are bent rearward and are attached to the sides of the reach C.

Each set of bars D H may be made in one piece, if desired.

To the forward ends of the bars D H are attached the single-trees I, to which the horses are attached.

To the upper and lower sides of the rear end of the reach C are attached the forward ends of the two plates J, which receive the axle K between their rear ends, and are pivoted to the said axle by a bolt, *k'*.

Upon the journals of the rear axle, K, revolve the rear wheels, L, and to the said axle K, at the inner ends of the hubs of the wheels L, are attached the ends of a bar, M, which is curved in the arc of a circle, works in a notch in the reach C, and has a hole in its center to receive a pin, N, passing through a hole in the reach C, to lock the rear wheels, L, in line with the forward wheels, A, when desired.

To the axle K is attached the forked forward end of the bar O, the rear end of which is provided with a cross-bar handle, *o'*, and which is designed for use for guiding the machine when the pin N has been withdrawn.

The inner part of the hub of one of the wheels A is made long, so as to extend nearly to the center of the axle B, and upon its inner end is formed, or to it is attached, a large bevel-gear wheel, P. Into the teeth of the gear-wheel P mesh the teeth of two small gear-wheels, Q, placed upon the shaft R, which passes through and works in a hole through the axle B and reach C. The gear-wheels Q are kept in proper position above and below the axle B by the guard-bars S, through the inwardly-bent forked outer ends of which the shaft R passes, and the inner ends of which are attached to the said axle B. One of the gear-wheels Q runs loose upon the shaft R, and the other is connected with it by a tongue and groove, so that the said gear-wheel may carry the said shaft with it in its revolution, while allowing the said shaft to have a free longitudinal movement.

To the lower end of the shaft R is attached the cutter T, for cutting cane and stubble, and which may be made circular, straight, or curved, as may be desired.

The upper end of the shaft R is swiveled to the lower end of a connecting-bar, U, or to a stirrup attached to the said end. The upper end of the bar U is pivoted to the end of a lever, V, which is pivoted to the upper end of the standard W. The lower end of the standard W is attached to the reach C, and to its side is attached the lower end of the curved arm X, which projects upward at the side of the lever V, and its upper part is slotted longitudinally to receive the bolt $x'$, attached to the lever V, and provided with a hand-nut, $x^2$, for locking the said lever in place when adjusted. The rear part of the lever V is bent and extends back to the side of the driver's seat Y, so that it can be readily reached and operated to raise and lower the cutter T, as may be required.

The driver's seat Y is attached to or formed upon the upper end of the standard Z, the lower end of which is attached to the reach C.

A' is a disk or hub having a screw-hole in its center to adapt it to be screwed upon the lower end of the shaft R when the cutter T has been detached. To the hub or disk A' are attached the inner ends of eight (more or less) spokes, B', the outer ends of which are attached to the rim C'. To each of the spokes B' is attached a hoe, D', as shown in Figs. 4 and 5.

The hoe-wheel A' B' C' D' is designed to be attached to the shaft R for removing the dirt from around stubble, and it may also be used for cultivating the ground.

It will be observed that the small gears are held in position by bearings bolted to an axle having in the middle a hole in line with small gears. The top gear has a key fitting in a groove of knife-shaft, so as to permit the shaft to work up and down at the will of the driver, and thus enable him to regulate the cutting. The bottom gear is an idler, to prevent the shaft, when under strain, from pulling the top gear out of place.

E F G form a pusher that bars off the cane to one side, so that it will fall lengthwise into the furrow, and so that the butts may be covered up and protected from the cold. In the spring the machine, without alteration, is used to shave the stubble, in order that it may sprout sooner.

The harrow or digger is worked by the same mechanism, being merely substituted for the rotary cutter.

Having thus described my invention, I claim as new and desire to secure by Letters Patent—

1. The two bars D, attached to forward end of reach C, curved to form cane-guides, and connected by parts E F G, as shown and described.

2. The bar H, attached to reach C at the ends, passing around the wheels A, attached to the ends of axle B, and conjoined with bars D, to form points of attachment for the singletrees, as shown and described.

3. The combination of the large bevel-gear wheel P, the two small bevel-gear wheels Q, and the guard-bars S with the inwardly-extended hub of the wheel A, the axle B, the reach C, and the shaft R, substantially as herein shown and described.

4. The combination of the connecting-bar U, the lever V, the standard W, and the curved and slotted arm X, provided with the bolt and hand-nut $x'$ $x^2$, with the sliding rotating shaft R, that carries the cutter T, and with the perch C, substantially as herein shown and described.

PHILIP SEITZ.

Witnesses:
 JAS. H. YOUNG,
 JOHN H. STANARD.